United States Patent
Ota

(10) Patent No.: US 8,339,512 B2
(45) Date of Patent: Dec. 25, 2012

(54) METHOD AND APPARATUS FOR ENHANCEMENT OF HIGH-DEFINITION VIDEO CONTENT

(75) Inventor: Takaaki Ota, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 921 days.

(21) Appl. No.: 12/398,899

(22) Filed: Mar. 5, 2009

(65) Prior Publication Data

US 2010/0225804 A1    Sep. 9, 2010

(51) Int. Cl.
*H04N 7/01*    (2006.01)
*H04N 11/20*    (2006.01)

(52) U.S. Cl. .......................... 348/458; 348/441
(58) Field of Classification Search .................. None
See application file for complete search history.

(56) References Cited

U.S. PATENT DOCUMENTS

| | | | |
|---|---|---|---|
| 7,215,831 B2 | 5/2007 | Altunbasak et al. | |
| 2005/0134731 A1* | 6/2005 | Lee et al. ....................... | 348/458 |
| 2007/0268400 A1* | 11/2007 | Kondo et al. .................. | 348/441 |
| 2008/0030614 A1* | 2/2008 | Schwab et al. ................ | 348/441 |
| 2009/0091653 A1* | 4/2009 | Kageyama et al. ........... | 348/441 |

FOREIGN PATENT DOCUMENTS

| | | |
|---|---|---|
| EP | 1906357 | 4/2008 |
| KR | 10-2000-0028961 A | 5/2000 |
| KR | 10-2001-0076691 A | 8/2001 |
| KR | 10-2002-0009909 A | 2/2002 |
| WO | WO-9933273 A1 | 7/1999 |
| WO | WO00/59206 | 10/2000 |

OTHER PUBLICATIONS

International Search Report and Written Opinion, PCT/US2010/000568, dated Sep. 29, 2010.
*Toshiba upconverting HDTV's announced*, Marteen Madison, Sep. 23, 2008 (http://www.cdfreaks.com/news/15045-Toshiba-upconverting-HDTVs-announced.html).
*Hitachi Claims Advanced Resolution Enhancement Technology*, Shinya Saeki et al., Sep. 25, 2008 (http://techon.nikkeibp.co.jp/english/NEWS_EN/20080925/158467/).

* cited by examiner

*Primary Examiner* — Jefferey Harold
*Assistant Examiner* — Sean Haiem
(74) *Attorney, Agent, or Firm* — Fitch, Even, Tabin & Flannery, LLP

(57) ABSTRACT

The detail and clarity of high-definition video content may be enhanced by a display device or client-side device before being displayed. In certain embodiments, the high-definition video image frames may be upsampled by scaling the image's resolution. The now-upsampled HD video image frames may then be low pass filtered so as to concentrate the image's energy distribution into a tighter range of frequencies. The filtered HD video image frames may then be sub-sampled back down, such as to the original HD image's frame resolution, or other HD-level resolution, without compromising image detail. In this fashion, the clarity and detail level in video content, even though already considered of a high-definition quality, may be further improved.

27 Claims, 5 Drawing Sheets

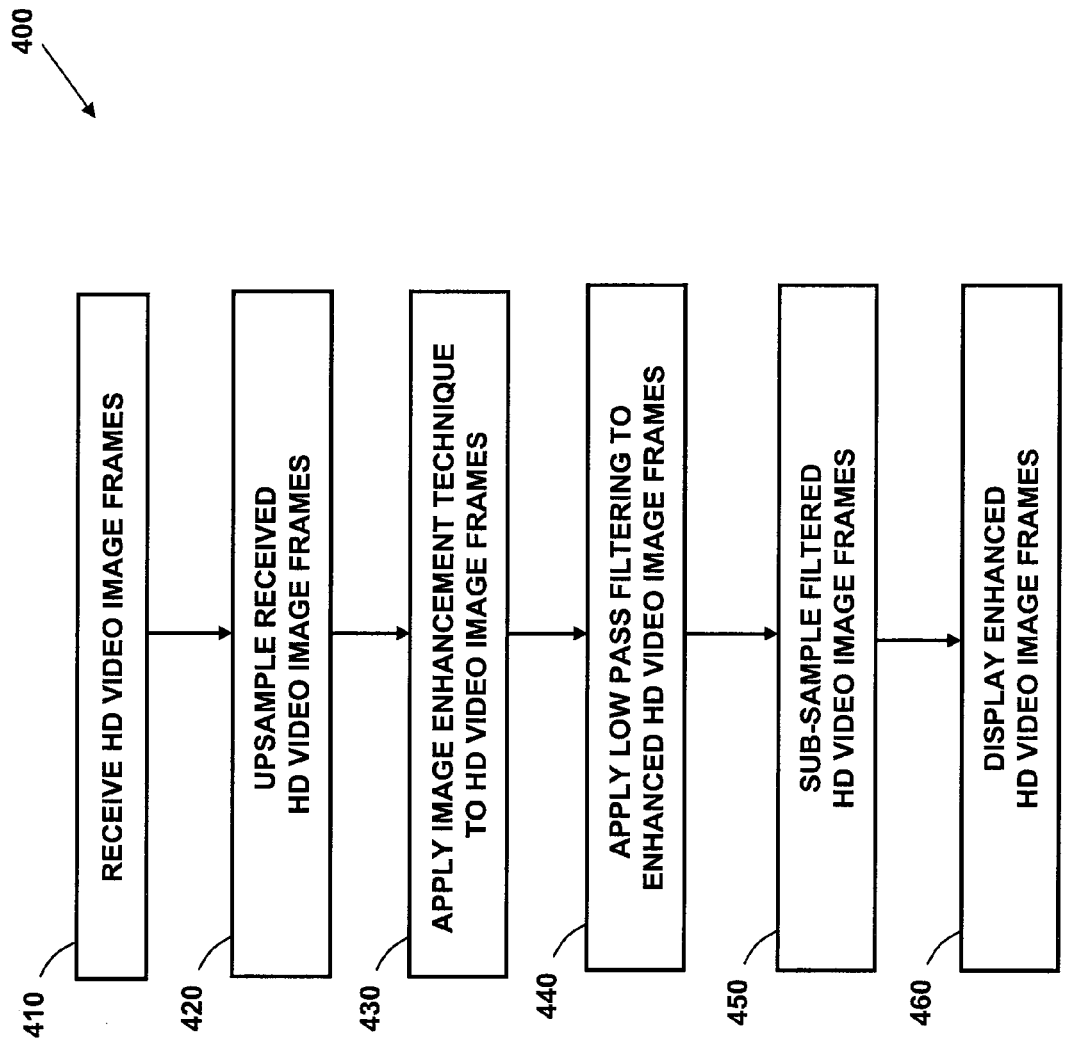

METHOD AND APPARATUS FOR ENHANCEMENT OF HIGH-DEFINITION VIDEO CONTENT

FIELD OF THE INVENTION

The invention relates in general to video image enhancement, and more particularly to enhancement of high-definition video content.

BACKGROUND OF THE INVENTION

Today various resolution enhancing technologies exist for up-converting or up-sampling standard definition (SD) signals that are to be displayed on a high definition television (HDTV). An SD image is generally regarded as having 480 pixels in the vertical direction, while an HD image is generally regarded as having at least 720 pixels vertically. Some of the various HDTV formats currently being used include 1024×768 (XGA), 1280×720 (720 p), 1366×768 (WXGA), 1280×1080 (1080 i), and 1920×1080 (1080 p).

One technique for performing resolution enhancement of SD video images is referred to as "super resolution" technology, which uses information from several sequential images to create one upsized image. In essence, this technology extracts details from one frame to reconstruct other frames. Other SD resolution enhancement techniques include spatial interpolation and sub-pixel motion compensation. Such resolution enhancing techniques are commonly used to up-convert DVD content for display on an HDTV, for example.

However, heretofore there has been little appreciation for the fact that full HD images also contain imperfections and can thus benefit from image enhancement. Thus, there is still an unsatisfied need for a method and apparatus for enhancement of high-definition video content.

SUMMARY OF THE INVENTION

Methods, apparatuses and computer program products for enhancing high-definition video content are disclosed and claimed herein. In one embodiment, a method includes receiving high-definition (HD) video image frames having an original frame resolution, and then upsampling the HD video image frames to an upsized frame resolution, where the upsized frame resolution is a predetermined multiple of the original frame resolution. The method also includes low pass filtering the HD video image frames, and then sub-sampling the HD video image frames thereafter. The HD video image frames may then be displayed.

Other aspects, features, and techniques of the invention will be apparent to one skilled in the relevant art in view of the following detailed description of the invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIG. 4 depicts one embodiment of a process for carrying out one or more aspects of the invention.

DETAILED DESCRIPTION OF THE EXEMPLARY EMBODIMENTS

Overview of the Disclosure

Figure 1B:
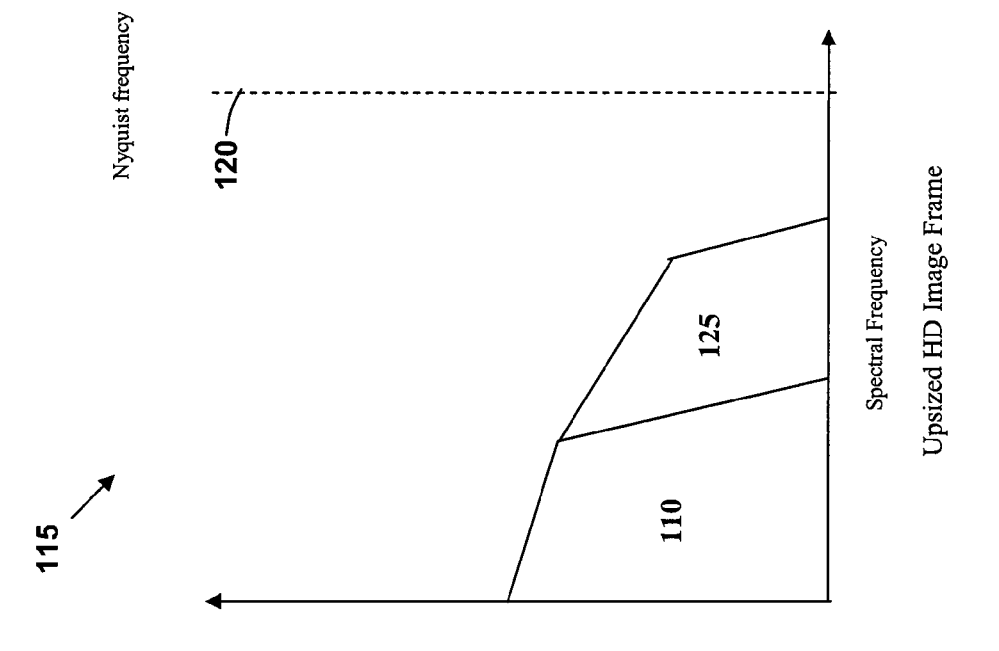
FIGS. 1B-1D depict exemplary graphs of energy distributions for HD video frame images after various processing operations and enhancements are performed in accordance with the principles of the invention.

The current disclosure relates to enhancing HD video content after it is received by a display device (e.g., television), set-top box or similar client-side device before being displayed. In certain embodiments, the HD video image frame may be first upsampled by scaling the image's resolution. This upsampling process may include the application of an image enhancement technique, such as a "super resolution" process. Thereafter, the HD video image frame may be low pass filtered so as to concentrate the image's energy distribution into a tighter range of frequencies. Finally, the now-filtered HD video image frame sub-sampled back down, such as to the original HD image's frame resolution, or any other HD-level resolution. In certain embodiments, the aforementioned processing will tend to cause even more of the available energy distribution to be utilized, and hence more image detail will be available to be displayed. In this fashion, the clarity and detail level in video content, even though already considered of a high-definition quality, may be improved.

As used herein, the term "HD" will refer to video content that has a frame resolution of at least 720 pixels in the vertical direction.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner on one or more embodiments without limitation.

In accordance with the practices of persons skilled in the art of computer programming, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the invention are essentially the code segments to perform the necessary tasks. The code segments can be stored in a "processor storage medium," which includes any medium that can store information. Examples of the processor storage medium include an electronic circuit, a semiconductor memory device, a ROM, a flash memory or other non-volatile memory, a floppy diskette, a CD-ROM, an optical disk, a hard disk, etc.

Description of the Exemplary Embodiments

Figure 1A:
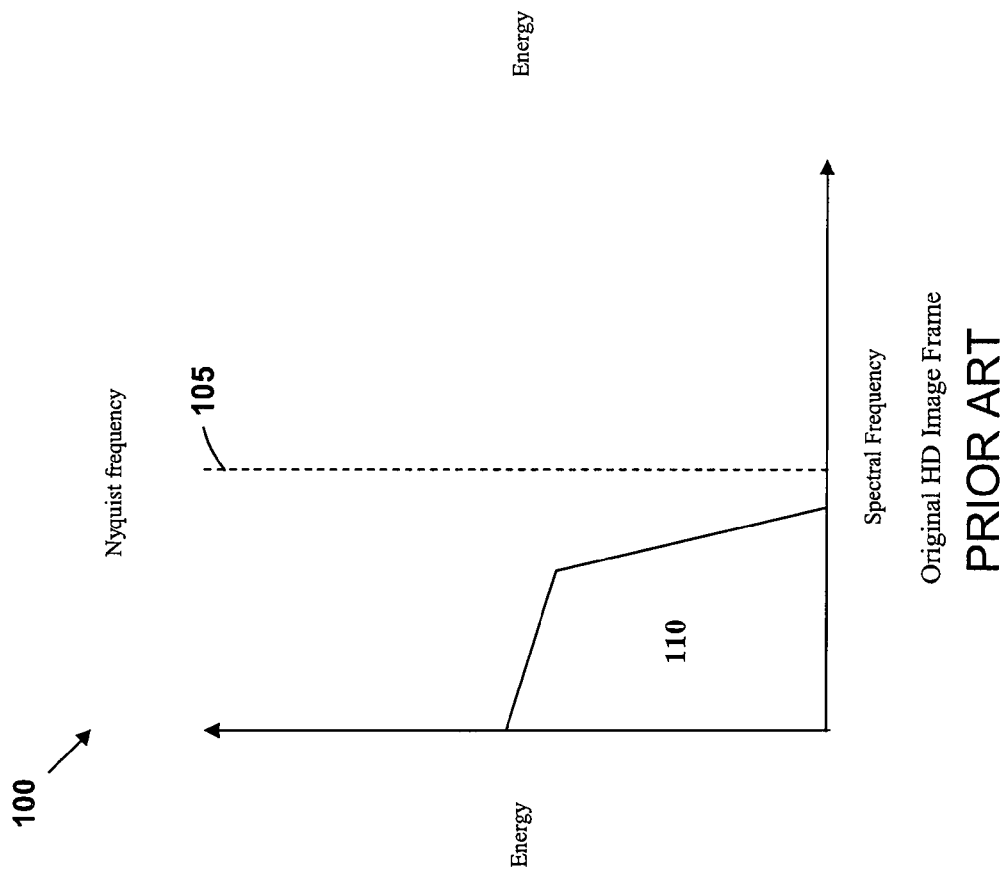
FIG. 1A depicts a graph of the typical energy distribution for an HD video frame image.

Referring now to FIG. 1A, depicted is an exemplary graph 100 of the energy distribution for an HD video image, where the image's energy (y-axis) is shown as a function of spectral frequency (x-axis). Essentially FIG. 1A depicts a histogram of the two-dimensional Fourier transform of the image. As is generally known, the Nyquist frequency 105 represents the highest frequency that can be coded at, for a given sampling rate, in order to be able to fully reconstruct the signal. From FIG. 1A, we see that the energy 110 of the exemplary original HD image is not utilizing the full available frequency spectrum, and thus is not as detailed as it could be given the available bandwidth.

To that end, one aspect of the present disclosure is to upsize or upsample the original HD video image frame of FIG. 1A by first scaling (e.g., doubling, tripling, etc.) the image's resolution. This upsampling also has the effect of proportionally scaling (e.g., doubling, tripling, etc.) the Nyquist frequency such that the resulting Nyquist frequency after the upsampling operation is shown in graph 115 of FIG. 1B as frequency 120.

Unfortunately, simply upsampling the HD video image frame resolution will have no beneficial effect on the frequency distribution of the image's energy 110. And since even less of the available frequency distribution would be used at that point (i.e., following the upsampling), the resulting upsized frame image will appear even blurrier. Thus, this upsampling procedure may be combined with or performed in connection with an image enhancement procedure which artificially recreates image details and thereby extends and improves the distribution of the video image's energy to include area 125, as shown in FIG. 1B. It should be appreciated that virtually any video image enhancement technique may be applied, including for example "super resolution" enhancement, which includes sequential multi-frame processing. The resolution enhancement to be used may also include mixed color separation in a single-frame processing operation and/or application of a statistical approach using pattern matching based on edge mending.

Figure 1C:
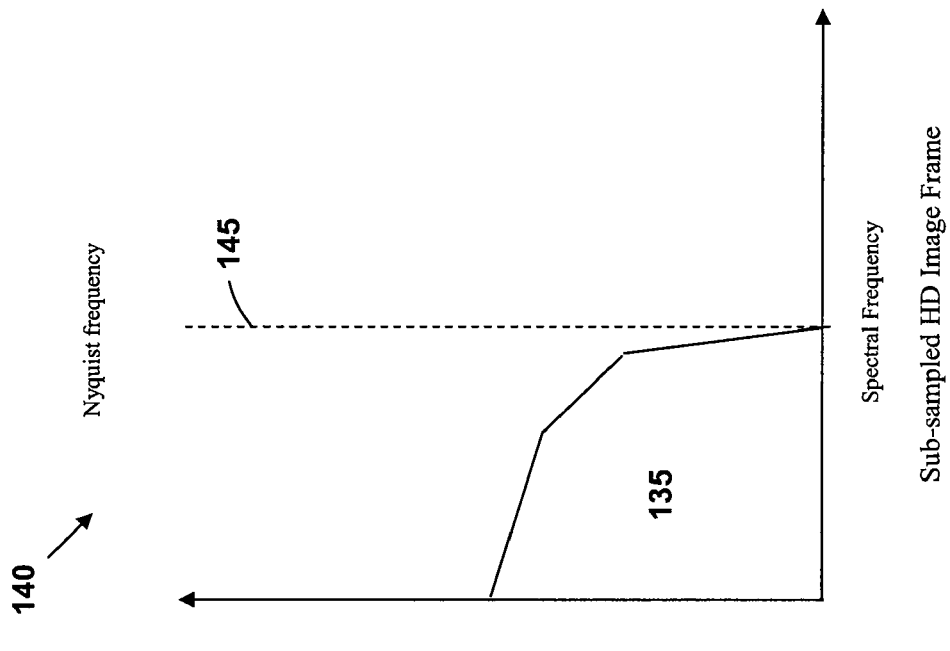

With reference now to graph 130 of FIG. 1C, following the upsampling and enhancement operations described above, a low pass filtering operation may be performed on the now-upsampled HD video image frame in order to further concentrate the image's energy distribution into a tighter range of frequencies. In one embodiment, the resulting (i.e., post-filtered) video image energy may be represented by area 135 of FIG. 1C.

Figure 1D:
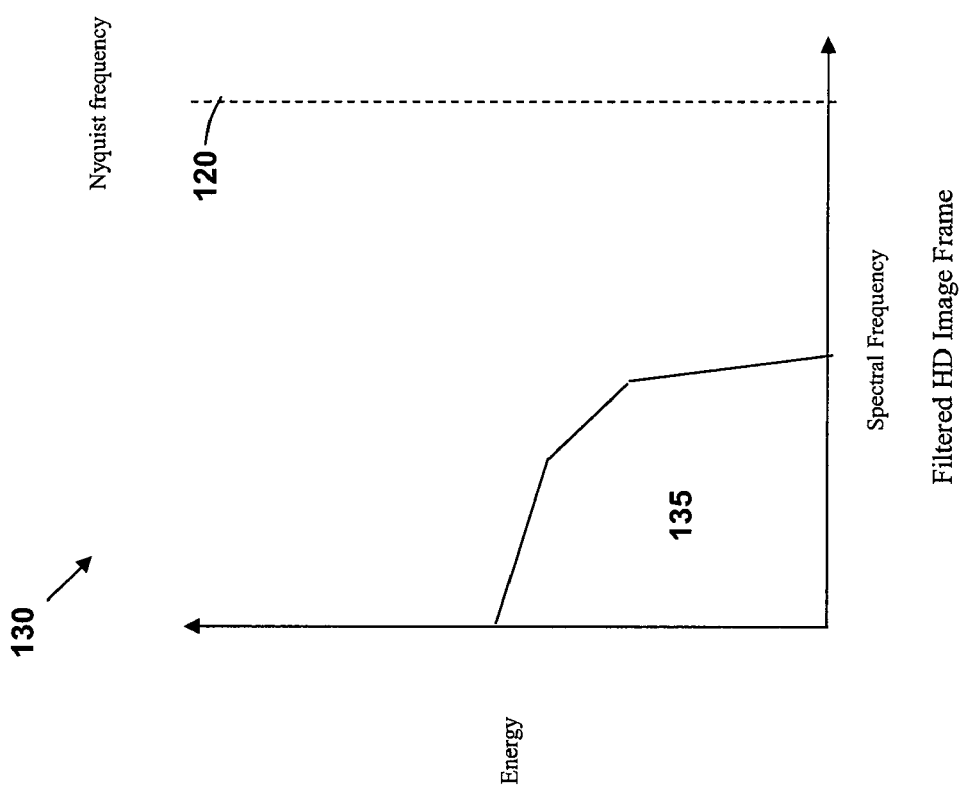

Once the HD video image frame has been low-pass filtered as described above, still another aspect of the present disclosure is to then sub-sample the now-filtered HD video image frame resolution back down to the original HD image's resolution, which will typically be either 720p, 1080i or 1080p. Alternatively, it may be desirable to sub-sample the now-filtered image to some other HD-level resolution. In any case, as shown in graph 140 of FIG. 1D the Nyquist frequency 145 will be proportionally decreased to a new frequency 145, corresponding to the new sub-sampled image resolution. In certain embodiments, this sub-sampling operation may be the mathematical inverse of the upsampling operation described above. For example, if the original HD image resolution is doubled in the aforementioned upsampling operation, it may be halved in this subsequent sub-sampling operation. Similarly, since the Nyquist frequency is affected in proportion to frame resolution sub-sampling, the resulting Nyquist frequency 145 of the now sub-sampled video image frame may be essentially the same as the Nyquist frequency of the original HD video image (i.e., Nyquist frequency 105 of FIG. 1A). Thus, even more of the available energy distribution will be utilized, and hence more image detail available to be displayed.

It should further be appreciated that the image processing described above with reference to FIGS. 1B-1D may be performed by a set-top box or in the display device itself. It should be noted that the upsampling, resolution enhancement, filtering and sub-sampling operations described above may be performed on a full-frame basis. However, since processing full frames may require a relatively large amount of memory, in another embodiment these operations may be performed on a block-by-block basis which tends to use far less memory, but does tend to increase the processing overhead.

Figure 2B:
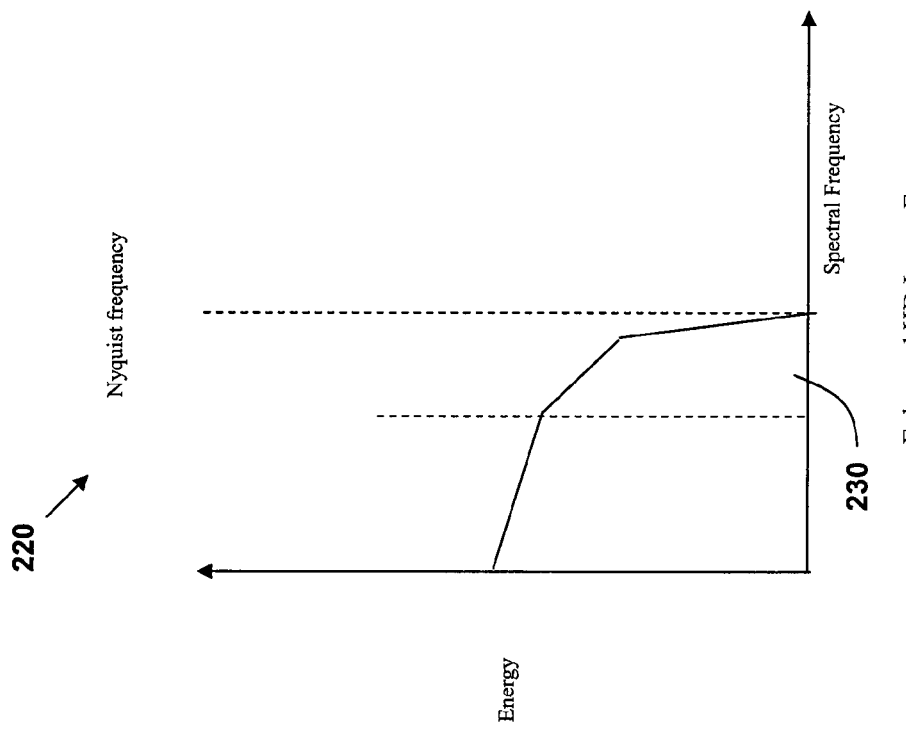
FIGS. 2A-2B depict graphs of the energy distributions for a given HD video frame image before and after being enhanced in accordance with one embodiment of the invention.
Figure 2A:
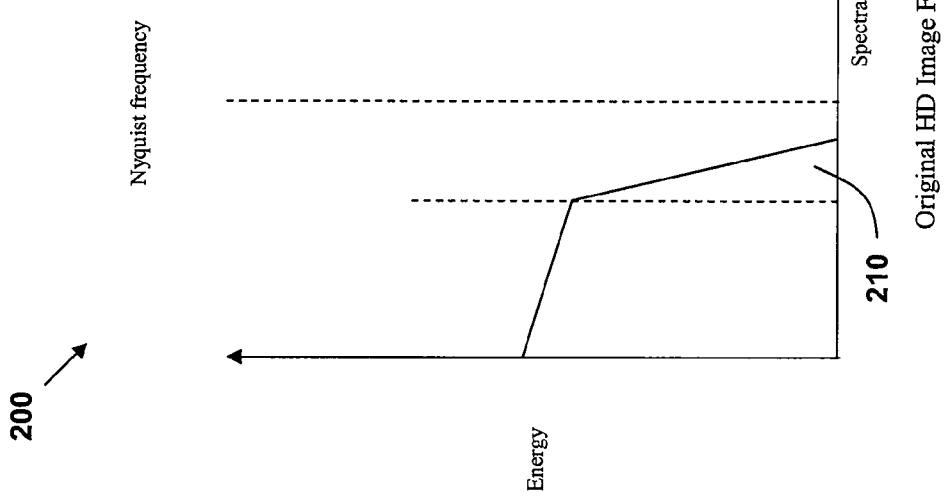

Referring now to FIGS. 2A-2B, depicted is a comparison between the energy distributions of an original HD video image frame (graph 200 of FIG. 2A) and a processed HD video image frame that has been enhanced in accordance with the principles of the invention (graph 220 of FIG. 2B). In particular, it can be seen that the energy distribution of graph 220 includes a greater amount of energy at the higher frequencies (see area 230) than the energy distribution of graph 220 (see area 210). The fact that area 230 includes more energy than area 210 means that the video image frame associated with graph 220 contains more detail than the image frame of graph 200, and hence will produce a sharper and clearer image. This is due to the fact that fine texture areas and sharp edges in an image contain high spatial frequency energy. This is the information susceptible to be lost in conversion processes, such as film-to-video (telecine) conversions, sample rate conversions or virtually any image manipulation process. The resolution enhancement process artificially recreates this lost information and thereby boosts the high frequency component energy.

Figure 3:
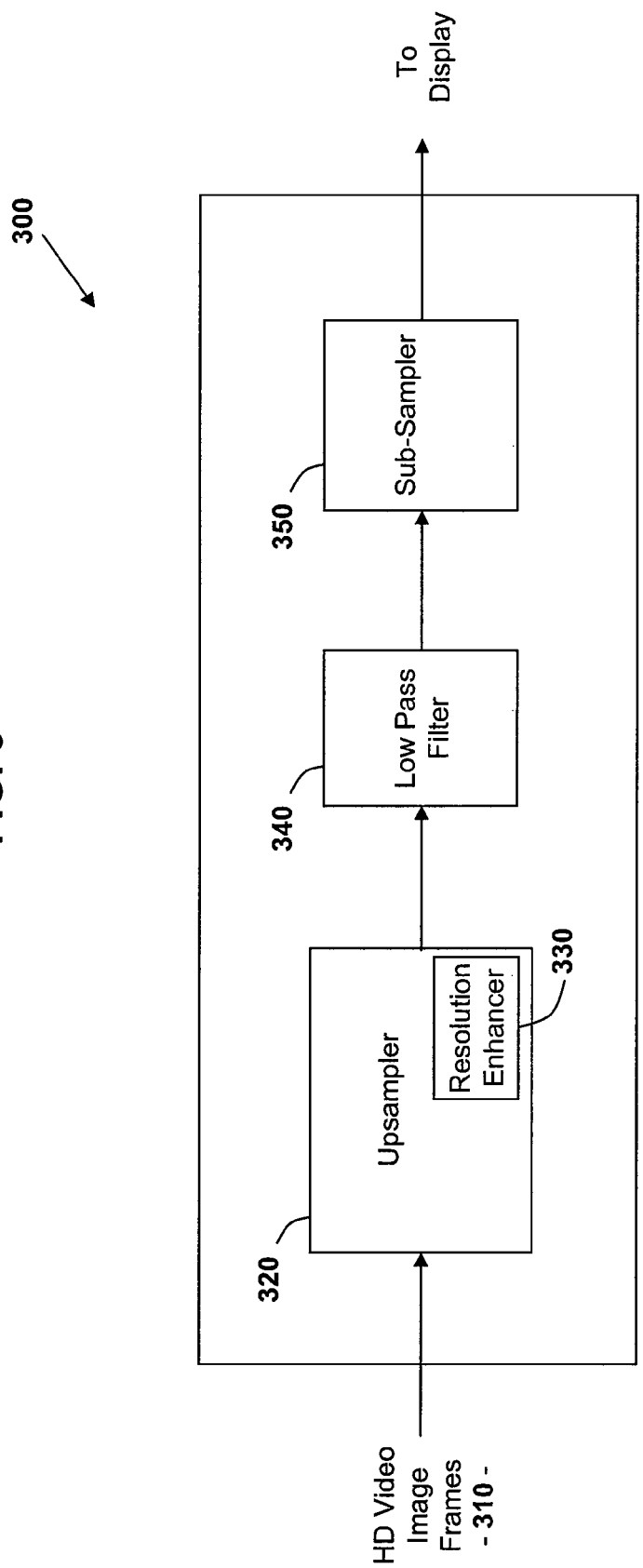
FIG. 3 depicts a simplified diagram of processing circuitry configured to implement one or more embodiments of the invention.

FIG. 3 depicts a simplified block diagram of processing circuitry 300, configured to implement one or more aspects of the invention. While in one embodiment, processing circuitry 300 may be implemented in a display device (e.g., television), it should further be appreciated that it may similarly be implemented in a set-top box or similar client-side device used to receive and process HD video content before providing it to a display.

As shown in FIG. 3, HD video content in the form of a sequence of HD video image frames 310 is received by the processing circuitry 300. Alternatively, the HD video content may be received as packetized data which is then converted into a video image frame data. The details of how HD video content may be converted to or otherwise processed as a series of video image frames are known in the art and need not be repeated herein.

It should further be appreciated that processing circuitry 300 may be combined with other circuitry in a display device or set-top box, or may be configured as a series of separate circuits. Additionally, the individual components which comprise the processing circuitry 300 may be combined or separated, and/or may be controlled by one or more separate processors (not shown), as is known in the art of circuit design and implementation. Additionally, each of the individual components which comprise the processing circuitry 300 may be implemented in hardware, software or any combination thereof.

As described above with reference to FIG. 1B, one aspect of the invention is to upsample the received HD video image frames by scaling (e.g., doubling, tripling, etc.) the image's resolution. In the embodiment of FIG. 3, this may be performed by upsampler 320. The upsampler may further comprise a resolution enhancer component 330 that artificially recreates image details to extend and improve the distribution of the video frame image's energy to include high frequencies, as depicted above in FIG. 1B. It should be appreciated that any known image enhancement technique may be applied. It should also be understood that the resolution enhancer component 330 may be separate from the upsampler 320.

Once the HD video image frame has been upsampled, the signal may be provided to low pass-filter 340. In one embodiment, the resulting (i.e., post-filtered) video image frame energy may be represented as previously depicted in FIG. 1C.

Once the HD video frame image has been low pass filtered, the HD signal may be provided to sub-sampler 350, which may be configured to downsize the now-filtered HD video image frame resolution back down to the original HD image's resolution, or to some other desired HD-level resolution. In certain embodiments, this sub-sampling operation may be the mathematical inverse of the upsampling operation performed by the upsampler 320. For example, if the original HD image resolution is doubled by the upsampling 320, it may be correspondingly halved by the sub-sampler 350. Similarly, since the Nyquist frequency is affected in proportion to frame resolution sub-sampling, as described above, the resulting Nyquist frequency of the now sub-sampled video image frame may be essentially the same as that of the incoming HD video image frame 310, which means that even more of the available energy distribution will be utilized (see FIG. 1D), and hence more image detail available to be displayed.

It should be noted that the upsampler 320, resolution enhancer 330, low pass filter 340 and sub-sampler 350 may perform their respective operations, as described above, on either a full-frame basis or a block-by-block basis in order to reduce the system's memory requirements.

FIG. 4 depicts one embodiment of a process 400 for enhancing HD video content in accordance with the principles of the invention. In particular, process 400 may be implemented by the processing circuitry 300 of FIG. 3 and/or provide the various energy distributions and related image enhancements described above with reference to FIGS. 1B-1D.

Process 400 begins at block 410 where HD video content is received. As previously mentioned, this HD video content may be received by a display device (e.g., television), or initially by a set-top box before it is provided to a display device. The HD video content will preferably be in the form of video image frames, although it may initially be in a packetized form that is then converted into a series of video image frames.

Once received, the HD video image frames may be first upsized or upsampled by scaling the image's resolution (e.g., using upsampler 320 for example) at block 420. This upsampling also has the effect of proportionally scaling the Nyquist frequency (see e.g., Nyquist frequency 120 of FIG. 1B). In combination with or following the upsampling process of block 420, an image enhancement technique (e.g., using resolution enhancer 330 for example) may be applied to the upsampled HD video image frames at block 430 in order to artificially recreate image details and to thereby extend and improve the distribution of the video image's energy (see e.g., area 125 of FIG. 1B). As previously described, any video image enhancement technique may be applied that is consistent with the principles of the invention (e.g., "super resolution," mixed color separation, pattern matching, etc.)

At this point process 400 may continue to block 440 where the now-upsampled and enhanced HD video image frame may be low pass filtered (e.g., using low pass filter 340 for example). In certain embodiments, the result of this low pass filtering operation may be to concentrate the image's energy distribution into a tighter range of frequencies (see e.g., area 135 of FIG. 1C).

Once the HD video image frame has been low pass filtered, process 400 may then continue to block 450 where the now-filtered HD video image frame resolution may be sub-sampled back down (e.g., using sub-sampler 350 for example) to either the original HD image's frame resolution, or any other HD-level resolution (e.g., 720p, 1080i, 1080p, etc.). As shown in previously-described FIG. 1D, this will cause even more of the available energy distribution to be utilized, and hence more image detail will be available to be displayed.

Thereafter, process 400 may continue to block 460 where the now-enhanced HD video image frames may be displayed, such as on a television screen.

While the invention has been described in connection with various embodiments, it should be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method for enhancing high-definition video content comprising:
   receiving a plurality of high-definition (HD) video image frames having an original frame resolution;
   upsampling the plurality of HD video image frames to an upsized frame resolution, wherein the upsized frame resolution is a predetermined multiple of the original frame resolution;
   low pass filtering the plurality of HD video image frames after the upsampling;
   sub-sampling the plurality of HD video image frames following the upsampling and the filtering; and
   displaying the plurality of HD video image frames following the upsampling, filtering and sub-sampling;
   wherein the low pass filtering concentrates each energy distribution of the plurality of HD video image frames into a range of frequencies lower than a Nyquist frequency associated with the original frame resolution.

2. The method of claim 1, wherein the original frame resolution comprises at least 720 vertical pixels.

3. The method of claim 1, wherein the upsampling the plurality of HD video image frames further comprises applying an image enhancement technique to the plurality of HD video image frames prior to the low pass filtering.

4. The method of claim 3, wherein the applying the image enhancement technique comprises applying at least one of a super resolution enhancement, a mixed color separate enhancement, and a pattern matching technique.

5. The method of claim 1, wherein the predetermined multiple comprises one of a multiple of two and a multiple of three.

6. The method of claim 1, wherein low pass filtering the plurality of HD video image frames comprises performing a two-dimensional full frame low pass filtering operation.

7. The method of claim 1, wherein low pass filtering the plurality of HD video image frames comprises performing a block-by-block low pass filtering operation.

8. The method of claim 1, wherein the sub-sampling the plurality of HD video image frames comprises sub-sampling the plurality of HD video image frames back down to the original frame resolution.

9. An apparatus to enhance high-definition video content comprising:
   a means for receiving a plurality of high-definition (HD) video image frames having an original frame resolution;
   a means for upsampling the plurality of HD video image frames to an upsized frame resolution, wherein the upsized frame resolution is a predetermined multiple of the original frame resolution;
   a low pass filter electrically coupled to the means for upsampling; and
   a means for sub-sampling the plurality of HD video image frames electrically coupled to the low pass filter;
   wherein the low pass filter concentrates each energy distribution of the plurality of HD video image frames into a range of frequencies lower than a Nyquist frequency associated with the original frame resolution.

10. The apparatus of claim 9, wherein the original frame resolution comprises at least 720 vertical pixels.

11. The apparatus of claim 9, wherein the means for upsampling the plurality of HD video image frames further comprises means for applying an image enhancement technique to the plurality of HD video image frames prior to delivery to the low pass filter.

12. The apparatus of claim 11, wherein the means for applying the image enhancement technique comprises means for applying at least one of a super resolution enhancement, a mixed color separate enhancement, and a pattern matching technique.

13. The apparatus of claim 9, wherein the predetermined multiple comprises one of a multiple of two and a multiple of three.

14. The apparatus of claim 9, wherein the low pass filter comprises a two-dimensional full frame low pass filter.

15. The apparatus of claim 9, wherein the low pass filter comprises a block-by-block low pass filter.

16. The apparatus of claim 9, wherein the means for sub-sampling the plurality of HD video image frames comprises means for sub-sampling the plurality of HD video image frames back down to the original frame resolution.

17. A computer program comprising: a non-transitory computer storage medium having computer executable program code embodied therein to enhance high-definition video content, the computer storage medium having:
   computer executable program code to receive a plurality of high-definition (HD) video image frames having an original frame resolution;
   computer executable program code to upsample the plurality of HD video image frames to an upsized frame resolution, wherein the upsized frame resolution is a predetermined multiple of the original frame resolution;
   computer executable program code to perform a low pass filter operation on the plurality of HD video image frames after the upsampling;
   computer executable program code to sub-sample the plurality of HD video image frames after the upsampling and low pass filtering; and
   computer executable program code to provide the plurality of HD video image frames to a display after the upsampling, the filtering, and the sub-sampling;
   wherein the low pass filter operation concentrates each energy distribution of the plurality of HD video image frames into a range of frequencies lower than a Nyquist frequency associated with the original frame resolution.

18. The computer program product of claim 17, wherein the original frame resolution comprises at least 720 vertical pixels.

19. The computer program product of claim 17, wherein the computer executable program code to upsample the plurality of HD video image frames further comprises computer executable program code to apply an image enhancement technique to the plurality of HD video image frames prior to the low pass filtering.

20. The computer program product of claim 19, wherein the computer executable program code to apply the image enhancement technique comprises computer executable program code to apply at least one of a super resolution enhancement, a mixed color separate enhancement, and a pattern matching technique.

21. The computer program product of claim 17, wherein the predetermined multiple comprises one of a multiple of two and a multiple of three.

22. The computer program product of claim 17, wherein the computer executable program code to perform the low pass filter operation on the plurality of HD video image frames comprises computer executable program code to perform a two-dimensional full frame low pass filtering operation.

23. The computer program product of claim 17, wherein the computer executable program code to perform the low pass filter operation on the plurality of HD video image frames comprises computer executable program code to perform a block-by-block low pass filtering operation.

24. The computer program product of claim 17, wherein the computer executable program code to sub-sample the plurality of HD video image frames comprises computer executable program code to sub-sample the plurality of HD video image frames back down to the original frame resolution.

25. The computer program product of claim 19, wherein the image enhancement technique is applied to the plurality of HD video image frames after the upsampling.

26. The apparatus of claim 11, wherein the image enhancement technique is applied to the plurality of HD video image frames after the upsampling.

27. The method of claim 3, wherein the image enhancement technique is applied to the plurality of HD video image frames after the upsampling.

* * * * *